US012585812B2

(12) United States Patent
Thomsen et al.

(10) Patent No.: US 12,585,812 B2
(45) Date of Patent: Mar. 24, 2026

(54) MANAGING ENCRYPTION DATA FOR SYSTEM REPLICATION OF DATABASE SYSTEMS

(71) Applicant: SAP SE, Walldorf (DE)

(72) Inventors: Dirk Thomsen, Heidelberg (DE);
Christoph Roterring, Walldorf (DE);
Martin Schindewolf, Walldorf (DE)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 18/468,570

(22) Filed: Sep. 15, 2023

(65) Prior Publication Data

US 2025/0094620 A1     Mar. 20, 2025

(51) Int. Cl.
*G06F 21/62*     (2013.01)
*G06F 11/1446*     (2026.01)
*G06F 21/60*     (2013.01)

(52) U.S. Cl.
CPC ...... *G06F 21/6227* (2013.01); *G06F 11/1448* (2013.01); *G06F 11/1464* (2013.01); *G06F 21/602* (2013.01)

(58) Field of Classification Search
CPC ............ G06F 21/6227; G06F 11/1448; G06F 11/1464; G06F 21/602
See application file for complete search history.

(56) References Cited

U.S. PATENT DOCUMENTS

| | | | | |
|---|---|---|---|---|
| 9,928,210 | B1 * | 3/2018 | Zhang | G06F 15/8084 |
| 2016/0147859 | A1 * | 5/2016 | Lee | G06F 11/1471 |
| | | | | 707/615 |
| 2021/0359855 | A1 * | 11/2021 | Voss | G06F 11/1458 |

* cited by examiner

*Primary Examiner* — Ayoub Alata
(74) *Attorney, Agent, or Firm* — Fountainhead Law Group, PC

(57) ABSTRACT

Some embodiments provide a non-transitory machine-readable medium that stores a program. The program takes a first snapshot of a first set of data stores configured to store data associated with a database system. After taking the first snapshot of the first set of data stores, the program further takes a second snapshot of a second set of data stores configured to store a set of encryption keys for a set of tenants of the database system. The program also transmits data included in the first snapshot of the first set of data stores to a secondary system. The program further transmits data included in the second snapshot of the second set of data stores to the secondary system.

17 Claims, 8 Drawing Sheets

Taking a first snapshot of a first data store configured to store data associated with a database system ~410

After taking the first snapshot of the first data store, taking a second snapshot of a second data store configured to store a set of encryption keys for a set of tenants of the database system ~420

Transmitting data included in the first snapshot of the first data store to a secondary system ~430

Transmitting data included in the second snapshot of the second data store to the secondary system ~440

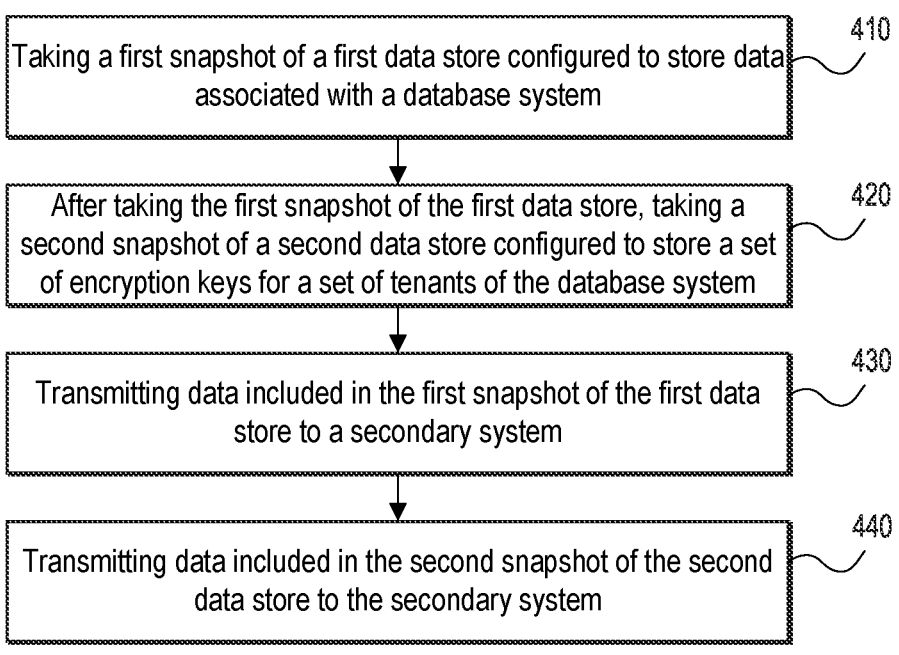

Taking a first snapshot of a first data store configured to store data associated with a database system 　410

After taking the first snapshot of the first data store, taking a second snapshot of a second data store configured to store a set of encryption keys for a set of tenants of the database system 　420

Transmitting data included in the first snapshot of the first data store to a secondary system 　430

Transmitting data included in the second snapshot of the second data store to the secondary system 　440

FIG. 4

MANAGING ENCRYPTION DATA FOR SYSTEM REPLICATION OF DATABASE SYSTEMS

BACKGROUND

Embodiments generally relate to encryption key management and in particular to methods of managing group-level database encryption keys for system replication of database management systems.

Encryption of persisted in-memory database data is typically done at the level of a persisted data volume. Such data-volume-level encryption has the benefit of protecting the persisted data should physical access be improperly obtained to media containing the persisted database data. However, in the case of cloud-based, multi-tenant applications using an in-memory database, data of multiple customers may be stored in a single in-memory database system. In such a case, the data for each customer in the multi-tenant application should be separately encrypted such that each individual customer has exclusive control the customer's own encryption key(s), thereby ensuring group-level data privacy for the customer of a multi-tenant cloud-based application. Moreover, when replicating database management systems (e.g., from a primary system to a secondary system), such group-level encryption and decryption processes should not result in wrong encryption keys being used to encrypt and decrypt data in the replicated database management system in the event the replicated database management system is deployed (e.g., the primary system fails).

Accordingly, what is needed is a method for efficiently and reliably managing group-level database encryption keys for system replication of database management systems where correct encryption keys are used to encrypt and decrypt data on the replicated database management system, thereby addressing the above-mentioned problems.

SUMMARY

In some embodiments, a non-transitory machine-readable medium stores a program executable by at least one processing unit of a primary system. The program takes a first snapshot of a first set of data stores configured to store data associated with a database system. After taking the first snapshot of the first set of data stores, the program further takes a second snapshot of a second set of data stores configured to store a set of encryption keys for a set of tenants of the database system. The program also transmits data included in the first snapshot of the first set of data stores to a secondary system. The program further transmits data included in the second snapshot of the second set of data stores to the secondary system.

In some embodiments, the secondary system is configured to replicate a state of the primary system based on the data included in the first snapshot of the first set of data stores and the data included in the second snapshot of the second set of data stores.

In some embodiments, the program further generates log data comprising changes to the database system since a last system save point; determines a set of encryption keys to use to encrypt the log data; encrypts the log data with the set of encryption keys; stores the encrypted log data in a first log data store; and transmits the encrypted log data to the secondary system. The secondary system is configured to store the encrypted log data in a second log data store.

In some embodiments, the secondary system is further configured to operate in a replay mode where the secondary system replays log data stored in the second log data store.

In some embodiments, the set of encryption keys is a first set of encryption keys. The secondary system replays the encrypted log data stored in the second log data store by determining a second set of encryption keys to use to decrypt the encrypted log data, decrypting the encrypted log data with the set of encryption keys, and replaying the decrypted log data.

In some embodiments, the program further determines a new set of encryption keys for a tenant of the database system; stores the new set of encryption keys in the second set of data stores; generates a first set of log data that includes data stored in the second set of data stores; generates a second set of log data indicating that the new set of encryption keys are determined for the tenant for the database system; and transmits the first set of log data and the second set of log data to the secondary system.

In some embodiments, the program further, after transmitting the data included in the first snapshot of the first set of data stores and the data included in the second snapshot of the second set of data stores to the secondary system, does not transmit any more data stored in the first set of data stores to the secondary system.

In some embodiments, a method is executable by a primary system. The method takes a first snapshot of a first set of data stores configured to store data associated with a database system. After taking the first snapshot of the first set of data stores, the method further takes a second snapshot of a second set of data stores configured to store a set of encryption keys for a set of tenants of the database system. The method also transmits data included in the first snapshot of the first set of data stores to a secondary system. The method further transmits data included in the second snapshot of the second set of data stores to the secondary system.

In some embodiments, the secondary system is configured to replicate a state of the primary system based on the data included in the first snapshot of the first set of data stores and the data included in the second snapshot of the second set of data stores.

In some embodiments, the method further generates log data comprising changes to the database system since a last system save point; determines a set of encryption keys to use to encrypt the log data; encrypts the log data with the set of encryption keys; stores the encrypted log data in a first log data store; and transmits the encrypted log data to the secondary system, wherein the secondary system is configured to store the encrypted log data in a second log data store.

In some embodiments, the secondary system is further configured to operate in a replay mode where the secondary system replays log data stored in the second log data store.

In some embodiments, the set of encryption keys is a first set of encryption keys. The secondary system replays the encrypted log data stored in the second log data store by determining a second set of encryption keys to use to decrypt the encrypted log data, decrypting the encrypted log data with the set of encryption keys, and replaying the decrypted log data.

In some embodiments, the method further determines a new set of encryption keys for a tenant of the database system; stores the new set of encryption keys in the second set of data stores; generates a first set of log data that includes data stored in the second set of data stores; generates a second set of log data indicating that the new set of encryption keys are determined for the tenant for the database system; and transmits the first set of log data and the second set of log data to the secondary system.

In some embodiments, the method further, after transmitting the data included in the first snapshot of the first set of data stores and the data included in the second snapshot of the second set of data stores to the secondary system, does not transmit any more data stored in the first set of data stores to the secondary system.

In some embodiments, a primary system includes a set of processing units; and a non-transitory machine-readable medium that stores instructions. The instructions cause at least one processing unit to take a first snapshot of a first set of data stores configured to store data associated with a database system. The instructions further cause the at least one processing unit to after taking the first snapshot of the first set of data stores, take a second snapshot of a second set of data stores configured to store a set of encryption keys for a set of tenants of the database system. The instructions also cause the at least one processing unit to transmit data included in the first snapshot of the first set of data stores to a secondary system. The instructions further cause the at least one processing unit to transmit data included in the second snapshot of the second set of data stores to the secondary system.

In some embodiments, the secondary system is configured to replicate a state of the primary system based on the data included in the first snapshot of the first set of data stores and the data included in the second snapshot of the second set of data stores.

In some embodiments, the instructions further cause the at least one processing unit to generate log data comprising changes to the database system since a last system save point; determine a set of encryption keys to use to encrypt the log data; encrypt the log data with the set of encryption keys; store the encrypted log data in a first log data store; and transmit the encrypted log data to the secondary system, wherein the secondary system is configured to store the encrypted log data in a second log data store.

In some embodiments, the secondary system is further configured to operate in a replay mode where the secondary system replays log data stored in the second log data store.

In some embodiments, the set of encryption keys is a first set of encryption keys. The secondary system replays the encrypted log data stored in the second log data store by determining a second set of encryption keys to use to decrypt the encrypted log data, decrypting the encrypted log data with the set of encryption keys, and replaying the decrypted log data.

In some embodiments, the instructions further cause the at least one processing unit to determine a new set of encryption keys for a tenant of the database system; store the new set of encryption keys in the second set of data stores; generate a first set of log data that includes data stored in the second set of data stores; generate a second set of log data indicating that the new set of encryption keys are determined for the tenant for the database system; and transmit the first set of log data and the second set of log data to the secondary system.

The following detailed description and accompanying drawings provide a better understanding of the nature and advantages of various embodiments of the present disclosure.

BRIEF DESCRIPTION OF THE DRAWINGS

FIG. 4 illustrates a process for managing encryption data for system replication of database systems according to some embodiments.

DETAILED DESCRIPTION

Figure 1:
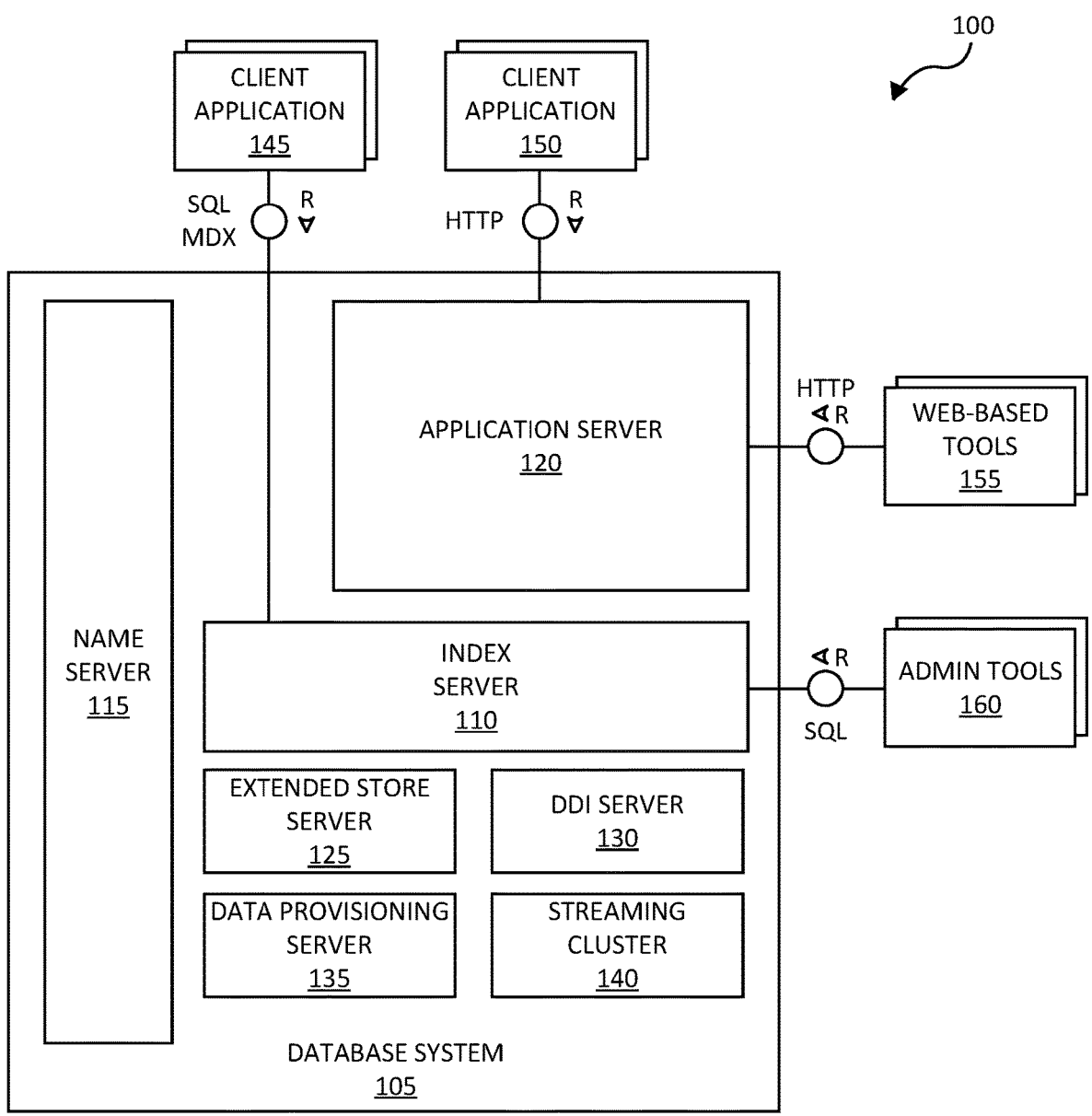
FIG. 1 illustrates an example database system for use in connection with the current subject matter according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

In some cases, cloud-based, multi-tenant applications need to provide data privacy on a tenant-by tenant basis, and in some cases a particular tenant has the requirement to be responsible for the tenant's own encryption keys so that even an operator of a cloud-based application or a data center in which the application is being hosted will not have access to the tenant's data. In some embodiments, to encrypt data on a tenant-by-tenant basis, encryption groups are employed. In some embodiments, each tenant is associated with its own encryption group. In some alternative embodiments, tenants share encryption groups. A data container is a logical unit of persistence which may be encrypted at a group-level. In some embodiments, each data container is assigned to a particular encryption group. Data within one encryption group is encrypted and decrypted with the same group-level encryption key. In some embodiments, metadata associated with each container includes an encryption group identifier corresponding to which encryption group with which the container is associated. In these embodiments, this is the container directory entry.

Keys for group-level encryption are stored in connection with a key management system (KMS). In addition to the KMS a local secure store (LSS) may be provided, which is used to cache the keys. In some embodiments, a single LSS instance is provided for all tenants in an in-memory database system. In some alternative embodiments, an LSS instance is provided for each tenant with group-level encrypted data in the in-memory database system. In any case, an in-memory database system having group-level encrypted data for a plurality of tenants needs to access a tenant-specific LSS in order to access group-level encryption keys specific to the tenant's data and a particular version of the group-level encryption key, since multiple keys may be used for a particular tenant, for example when the particular tenant performs a key rotation.

In some embodiments, a tenant identifier corresponds to an LSS identifier in a one-to-one mapping, meaning that one and only one tenant corresponds to one and only one set of group-level encryption keys. In some alternative embodiments, a an LSS identifier may correspond to a particular organization such as a particular corporate entity, with the particular corporate entity, or super-tenant, itself having several tenants represented within the in-memory database system. In these embodiments the set of tenants that correspond to the particular corporate entity may share an encryption group and, therefore, an LSS identifier.

As noted above, group-level encryption keys may change if a tenant (or super-tenant) decides to create a new key, which is referred to as key rotation. For encryption and/or decryption of data pages as well as redo/undo/cleanup logs a particular group-level encryption key version needs to be determinable. For security reasons, encryption keys may not be persisted in connection with any persistent storage associated with the in memory database, but a key identifier with any associated version must be available to the database. Therefore, a mapping from an encryption group identifier at a particular valid-from save point version to an appropriate key source must be available. Because group-level encryption keys must not be stored in persistency, the keys are contained in the transient mapping only while the persistent mapping stored in the data volume may not contain the key.

Moreover, a new key may be created within the KMS at any time, therefore, in some embodiments, a database encryption manager polls the KMS for new keys once a save point cycle. If the encryption manager detects a new key, key metadata is added into the key mapping data structures, both transient and persistent. For security reasons, the group-level encryption keys themselves are only ever stored in transient mapping data structures and never written to persistent storage.

In some embodiments, at start-up of an exemplary in-memory database, transient mapping structures are constructed by iterating over the encryption-group identifier and valid-from save point version pairs, which are persisted in connection with the in-memory databases system data pages in one or more data volumes associated with the in-memory database. In these embodiments, one or more LSS instances associated with the in-memory database also starts up at database start-up and performs an LSS authentication process with one or more KMS instances. As part of the authentication and initialization of the one or more LSS instances, the LSS instances establish a main-memory cache corresponding to encryption keys and encryption key identifiers corresponding to a particular LSS identifier. As the in-memory databases iterates through the transient key mapping structure, for each LSS identifier, the in memory-database iteratively builds an in-memory mapping from pairs LSS identifiers and key identifiers to pairs of encryption group identifiers and valid-from save point versions. In this way, when an encryption or decryption operation in the database must be performed, and appropriate key may be easily (and performantly) obtained by traversing or indexing into the transient mapping data structure. In some embodiments, in addition to storing an LSS identifier and key identifier pair, an encryption key itself is stored in a data payload easily accessible given the associated encryption key identifier, either in the same data structure or a separate data structure indexed by encryption key identifier. Building easily and performantly accessible mapping structures for mapping encryption group identifier and version to corresponding encryption key has the performance advantage of not needing to make a round-trip to a KMS or even an LSS to obtain an appropriate encryption key each time an encryption or decryption operation needs to be performed. Having a separate (LSS identifier, key identifier) pair to (encryption group identifier, valid-from save point version) pair has the advantage of not needing to store potentially large key identifiers in existing internal database structures. In some embodiments a key identifier is implemented as a 128-bit hash, which could not easily be added to a converter data structure for mapping logical pages to physical blocks, without unduly distorting the converter as used without group-level encryption.

A converter is a data structure that maintains a mapping from logical page numbers to corresponding physical block numbers. In some embodiments, converter metadata associated with the converter stores a value corresponding to the encryption group that each data page belongs to within a converter entry in the converter metadata. The converter entry provides a mapping from logical page number to physical block number. If a database operation requires that a data container needs to read in one or more data pages associated with the data container, the data container is a source of information regarding an association between an encryption group identifier and a page access function. In some embodiments, the corresponding encryption group identifier is used to decrypt the loaded group-level encrypted page content. The encryption group identifier is also stored within a transient page control block to be used for encrypting page content while flushing a page at such time as the page needs to be persisted after having been modified by a database operation. A transient page control block is an object that stores additional information for the page which is only needed for a limited amount of time. In some embodiments, a transient control page is a control block which is stored within a resource container and which holds a pointer to the actual in-memory representation of the page.

In some embodiments, data page content containing undo and/or cleanup log data is encrypted and/or decrypted with a corresponding group-level encryption key when a database system designates the log data as containing tenant specific content. In such a scenario, the page header is not encrypted with the group-level encryption key. In. some embodiments, the page header is encrypted with a data volume encryption key. In these embodiments, the unencrypted undo and/or cleanup log entries are also encrypted with the corresponding data volume encryption key, i.e. the entire data page containing a header and log entries is encrypted with the data volume encryption key. In some alternative embodiments, the page header is unencrypted. In these embodiments, undo and/or cleanup log data that is not tenant specific is also unencrypted.

Generally speaking, a page header is not encrypted with the group-level encryption key so that that the information from the page header can be read for database internal operations such as backup and recovery and data volume resizing, where pages need to be accessed by the database system, but the corresponding user (tenant) content needs to remain encrypted with the group-level encryption key(s).

In addition to the requirement that persisted user data be encrypted with tenant-specific encryption keys, some database logs may also contain user data that must be protected with group-level encryption. For example, a redo log corresponding to inserting a record into a table will by necessity contain the contents of the fields of the inserted record. Such contents are user data and should be encrypted with group-level encryption corresponding to one or more encryption keys controlled by the tenant who owns the particular data. When writing to logs, the encryption group identifier is stored within the unencrypted log header, and upon finishing the log entry, the entry is encrypted using the key for that encryption group identifier. This is true for redo logs as well as undo and/or cleanup log entries. During log replay, a log management process first reads the encryption group identifier from the log entry header, decrypts the log entry the with key for that encryption group identifier and then passes the decrypted log entry for further processing. In this way, group-level encrypted log decryption becomes transparent to all other layers, and in some cases, only during log writing would the encryption group identifier need to be specified.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Turning first to FIG. 1, which depicts a diagram 100 illustrating a database system 105 that can be used to implement aspects of the present teachings. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120.

Index server 110 may contain in-memory data stores and engines for processing data. Index server 110 may also be accessed by remote tools (via, for example, SQL queries), that can provide various development environment and administration tools. Additional details regarding an example implementation of index server 110 is described and illustrated in connection with diagram 200 of FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
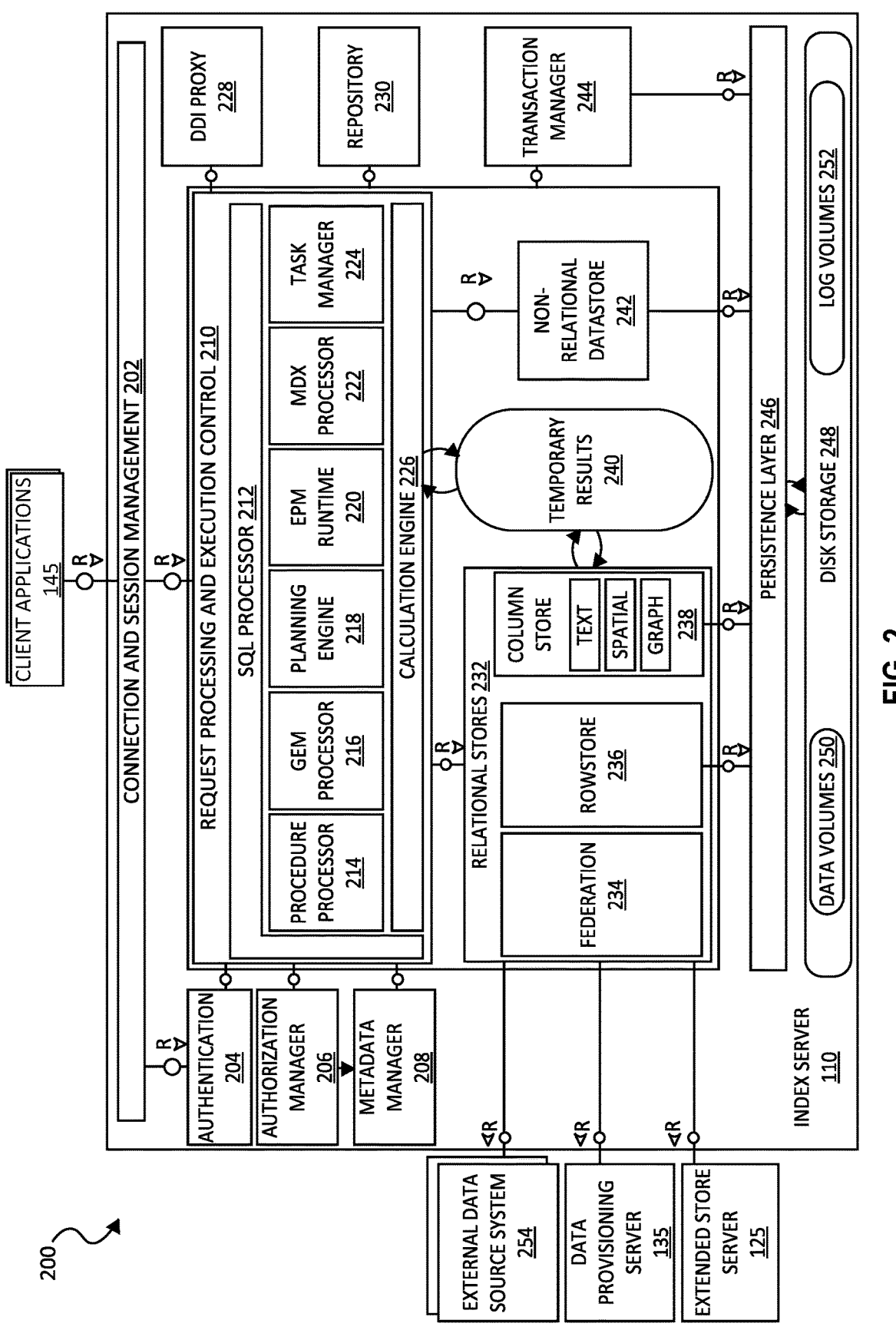
FIG. 2 illustrates an architecture for an index server for use in connection with the current subject matter according to some embodiments.

Turning now to FIG. 2, in which a diagram 200 illustrating an architecture for index server 110 is depicted. A connection and session management component 202 can create and manage sessions and connections for the client applications 145. For each session, a set of parameters can be maintained such as, for example, auto commit settings or the current transaction isolation level. Requests from the client applications 145 can be processed and executed by way of a request processing and execution control component 210. In various embodiments, database system 105 of FIG. 1 offers rich programming capabilities for running application-specific calculations inside the database system. In addition to SQL, MDX, and WIPE, database system 105 provides various programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by SQL processor 212 within the request processing and execution control component 210. Analytical applications may employ MDX language expressions, which may be evaluated in connection with MDX processor 222. For graph data, applications may employ GEM (Graph Query and Manipulation) via GEM processor 216, a graph query and manipulation language. In various embodiments, SQL statements and MDX queries may be sent over the same connection with the client application 145 using the same or similar network communication protocols. In some embodiments, GEM statements may be sent using a built-in SQL system procedure.

In various embodiments, index server 110 includes an authentication component 204 that can be invoked with a new connection with a client application 145 is established. Users can be authenticated either by the database system 105 itself (login with user and password) or authentication can be delegated to an external authentication provider. In some embodiments, authorization manager 206 can be invoked by other components of database system 105 to check whether a particular user has the required privileges to execute a requested operation. In various embodiments, requested operations in the form of statements or queries may be processed in the context of a transaction having a beginning and end so that any such transaction may be committed or rolled back. New sessions may be implicitly assigned to a new transaction. In various embodiments, index server 110 includes transaction manager 244 that coordinates transactions, controls transactional isolation, and keeps track of running and closed transactions. When a transaction is committed or rolled back, the transaction manager 244 can inform the involved engines about this event so they can execute necessary actions. Transaction manager 244 can provide various types of concurrency control and transaction manager 244 can cooperate with a persistence layer 246 to persist atomic and durable transactions.

In various embodiments, incoming SQL requests from client applications 145 are received by SQL processor 212. In some embodiments, data manipulation statements are executed by SQL processor 212 itself. In these embodiments, other types of requests are delegated to respective components for processing a corresponding type of request. Data definition statements can be dispatched to metadata manager 208, transaction control statements can be forwarded to transaction manager 244, planning commands can be routed to a planning engine 218, and task related commands can be forwarded to a task manager 224 (which can be part of a larger task framework) Incoming MDX requests can be delegated to the MDX processor 222. Procedure calls can be forwarded to the procedure processor 214, which further dispatches various calls, for example to a calculation engine 226, GEM processor 216, repository 230, or DDI proxy 228.

In various embodiments, index server 110 also includes planning engine 218 that enables implementation of planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

In various embodiments, SQL processor 212 includes an enterprise performance management (EPM) runtime component 220 that can form part of a larger platform providing an infrastructure for developing and running enterprise performance management applications in connection with database system 105. While planning engine 218 typically provides basic planning operations, in some embodiments, exemplary EPM platforms provide a foundation for complete planning applications, based on by application-specific planning models managed in connection with database system 105.

In various embodiments, calculation engine 226 provides a common infrastructure that implements various features such as SQL processing. SQLScript interpretation, evaluation of MDX and/or GEM, tasks, and execution of planning operations. In various embodiments SQL processor 212, MDX processor 222, planning engine 218, task manager 224, and GEM processor 216 can translate various corresponding programming languages, query languages, and models into a common representation that is optimized and executed by calculation engine 226. In various embodiments, calculation engine 226 implements those features using temporary results 240 which can be based, in part, on data within the relational stores 232.

Metadata can be accessed via metadata manager 208. Metadata, in this context, can comprise a variety of objects, such as definitions of relational tables, columns, views, indexes and procedures. In some embodiments, metadata of all such types can be stored in one common database catalog for all stores. In these embodiments, the database catalog can be stored in tables in row store 236 forming part of a group of relational stores 232. Other aspects of database system 105 including, for example, support and multi-version concurrency control can also be used for metadata management. In distributed systems, central metadata is shared across servers and metadata manager 208 can coordinate or otherwise manage such sharing.

In various embodiments, relational stores 232 provide a foundation for different data management components of index server 110. In these embodiments, relational stores can, for example, store data in main memory. In these embodiments, row store 236, column store 238, and federation component 234 are all relational data stores which can provide access to data organized in relational tables. Column store 238 can store relational tables column-wise (i.e., in a column-oriented fashion, etc.). Column store 238 can also comprise text search and analysis capabilities, support for spatial data, and operators and storage for graph-structured data. With regard to graph-structured data, from an application viewpoint, column store 238 could be viewed as a non-relational and schema-flexible, in-memory data store for graph-structured data. However, in various embodiments, such a graph store is not technically implemented as a separate physical data store. Instead, the graph store is built using column store 238, which may be provided in connection with a dedicated graph API.

In various embodiments, row store 236 stores relational tables row-wise. When a table is created, a creator specifies whether the table is to be row- or column-based. In various embodiments, tables can be migrated between the two storage formats of row- and column-based. While certain SQL extensions may be only available for one kind of table (such as the "merge" command for column tables), standard SQL may be used in connection with both types of tables. In various embodiments, index server 110 also provides functionality to combine both kinds of tables in one statement (join, sub query, union).

Federation component 234 can be viewed as a virtual relational data store. The federation component 234 can provide access to remote data in external data source system (s) 254 through virtual tables, which can be used in SQL queries in a fashion similar to normal tables. Database system 105 can include an integration of non-relational data store 242 into the index server 110. For example, the non-relational data store 242 can have data represented as networks of C++ objects, which can be persisted to disk or other persistent storage. Non-relational data store 242 can be used, for example, for optimization and planning tasks that operate on large networks of data objects, for example in supply chain management. Unlike row store 236 and column store 238, non-relational data store 242 does not use relational tables; rather, objects can be directly stored in containers provided by persistence layer 246. Fixed size entry containers can be used to store objects of one class. Persisted objects can be loaded via their persisted object identifiers, which can also be used to persist references between objects. In addition, access via in-memory indexes is supported. In that case, the objects need to contain search keys. In various embodiments, an in-memory search index is created on first access. Non-relational data store 242 can be integrated with the transaction manager 244 to extends transaction management with sub-transactions, and to also provide an alternative locking protocol and implementation of multi-version concurrency control.

An extended store is another relational store that can be used or otherwise form part of database system 105. In some embodiments, the extended store can, for example, be a disk-based column store optimized for managing very big tables, which tables are not meant to be kept in memory (as with relational stores 232). In various embodiments, the extended store can run in extended store server 125 separate from index server 110. Index server 110 can use the federation component 234 to send SQL statements to extended store server 125.

Persistence layer 246 is responsible for durability and atomicity of transactions. Persistence layer 246 can ensure that database system 105 is restored to a most recent committed state after a restart and that transactions are either completely executed or completely undone. To achieve this goal in an efficient way, persistence layer 246 can use a combination of write-ahead logs, undo and cleanup logs, shadow paging and save points. Persistence layer 246 can provide interfaces for writing and reading persisted data and it can also contain a logger component that manages a recovery log. Recovery log entries can be written in the persistence layer 246 (in recovery log volumes 252) explicitly by using a log interface or implicitly when using the virtual file abstraction. Recovery log volumes 252 can include redo logs which specify database operations to be replayed whereas data volume 250 contains undo logs which specify database operations to be undone as well as cleanup logs of committed operations which can be executed by a garbage collection process to reorganize the data area (e.g. free up space occupied by deleted data etc.).

Persistence layer 246 stores data in persistent disk storage 248 which, in turn, can include data volumes 250 and/or recovery log volumes 252 that can be organized in pages. Different page sizes can be supported, for example, between 4 KB and 16 MB. In addition, superblocks can also be supported which can have a larger size such as 64 MB and which can encapsulate numerous pages of different sizes. In various embodiments, database data is loaded from disk storage 248 and stored to disk page-wise. For read and write access, pages may be loaded into a page buffer in memory. Such a page buffer need not have a minimum or maximum size, rather, all free memory not used for other things can be used a page-buffer cache. If the memory is needed elsewhere, least recently used pages can be removed from the page-buffer cache. If a modified page is chosen to be removed, the page first needs to be persisted to disk storage 248. While the pages and the page-buffer cache are managed by persistence layer 246, the in-memory stores (i.e., the relational stores 232) can access data directly, within loaded pages.

As noted above, the data volumes 250 can include a data store that together with undo and cleanup log and recovery log volumes 252 comprise the recovery log. Other types of storage arrangements can be utilized depending on the desired configuration. The data store can comprise a snapshot of the corresponding database contents as of the last system save point. Such a snapshot provides a read-only static view of the database as it existed as of the point (i.e., time, etc.) at which the snapshot was created. Uncommitted transactions, at such time, are not reflected in the snapshot and are rolled back (i.e., are undone, etc.). In various embodiments, database snapshots operate at the data-page level such that all pages being modified are copied from the source data volume to the snapshot prior to their being modified via a copy-on-write operation. The snapshot can store such original pages thereby preserving the data records as they existed when the snapshot was created.

System save points (also known in the field of relational database servers as checkpoints) can be periodically or manually generated and provide a point at which the recovery log can be truncated. The save point can, in some variations, include an undo log of transactions which were open in the save point and/or a cleanup log of transactions which were committed in the save point but not yet garbage collected (i.e., data which has been deleted by these transactions has been marked as deleted but has not been deleted in a physical manner to assure multi-version concurrency control).

In some embodiments, a recovery log comprises a log of all changes to database system 105 since the last system save point, such that when a database server is restarted, its latest state is restored by replaying the changes from the recovery log on top of the last system save point. Typically, in a relational database system, the previous recovery log is cleared whenever a system save point occurs, which then starts a new, empty recovery log that will be effective until the next system save point. While the recovery log is processed, a new cleanup log is generated which needs to be processed as soon as the commit is replayed to avoid a growing data area because of deleted but not garbage collected data. In some embodiments, shadow pages that are designated to be freed are freed in connection with such a cleanup log. In some embodiments, a garbage collection process executes periodically to free data pages that are designated to be freed.

As part of a database system recovery/restart, after the save pointed state of data is restored, and before processing of the recovery log commences, all cleanup logs can be iterated through and, in implementations using a history manager, passed to the history manager for asynchronous garbage collection processing. In addition, it can be checked if there are older versions of the cleanup log present in the save point which need to be processed synchronously with regard to the recovery log. In such cases, recovery log processing can wait until garbage collection of old versions of cleanup logs finish. However, recovery log processing can commence when there are newer versions of cleanup logs for garbage collection. In cases in which no old versions of cleanup logs exist, recovery log replay can start immediately after the cleanup log from the save point has been passed to the history manager.

A typical save point can have three phases. First, in the pre-critical phase all modified pages in the relational stores 232 (which are loaded into memory) can be iterated through and flushed to the physical persistence disk storage 248. Second, a critical phase can block all parallel updates to pages in the relational stores 232 and trigger all the remaining I/O (i.e., I/O for pages still being modified when entering the critical phase) for the physical persistence disk storage 248 to ensure the consistent state of data. Lastly, a post-critical phase can wait for all remaining I/O associated with the physical persistence disk storage 248.

In various embodiments, database system 105 can be recovered after a failure or other error using information within the recovery log volumes 252 and the data volumes 250. As part of a recovery operation, pages from the backup storage 248 are streamed into the page-buffer cache in the main memory of database system 105. These pages can have different sizes from 4 KB to 16 MB, etc. For smaller page sizes, the write I/O can be slow (i.e., processing numerous small pages can create a bottleneck for a resource flushing thread, etc.). To overcome this restriction, in some variations, multiple pages can be filled in-memory into a super-block (which is a page of a different, larger size such as 64 MB), then the complete superblock can be written to disk 248.

In order to address the issues with write I/O, pages are copied into a superblock. When the database system 105 utilizes encryption for security purposes, each page is encrypted when the page is put into the superblock by a recovery channel (which is a single thread). Given that this operation is single threaded, the page-by-page encryption can be a bottleneck which can cause database recovery to require hours and/or days to complete.

For normal pages (i.e., non-superblocks, etc.), instead of encrypting such pages in the recovery channel, the pages can be encrypted when being flushed to the disk storage 248. With superblocks, additional information is required to encrypt each page. Within a recovery channel, the small pages are copied into a superblock and a control block (i.e., the superblock control block) is generated for the super-block. The control block can be a transient object that includes for each page such as an encryption key and an initialization vector (i.e., a fixed-size input to a crypto-graphic primitive that can be random or pseudorandom, etc.). When the superblock is filled with small pages, a resource flush thread, using a plurality of helper threads (e.g., 64 helper threads, etc.), encrypts the pages in the superblock in parallel using the information within the control block and causes the superblock to be flushed to disk storage 248.

Figure 3A:
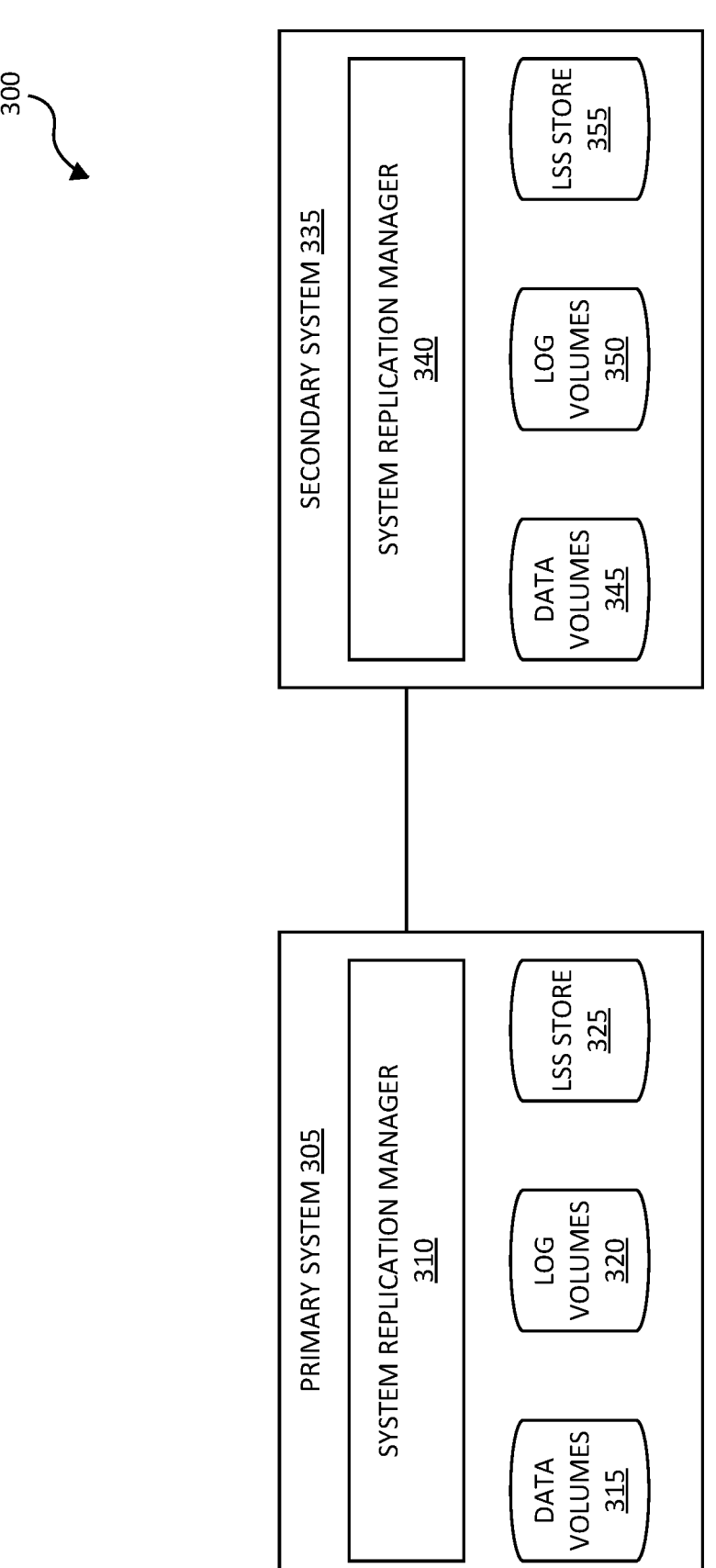
FIGS. 3A-3D illustrate an example system of a replicated database management system according to some embodiments.

Turning now to FIG. 3A, which illustrates an example system 300 of a replicated database management system according to some embodiments. As shown, system 300 includes primary system 305 and secondary system 335. In some embodiments, each of the primary system 305 and the secondary system 335 may be implemented using database system 105. In some such embodiments, primary system 305 and secondary system 335 can each include the same or similar components as those depicted in database system 105, which are described above by reference to FIG. 1. For the purpose of simplicity and explanation, many of the components in FIG. 1 are not shown in primary system 305 and secondary system 335.

For this example, primary system 305 is configured as the main system with which client applications and tools (e.g., client applications 145, client application 150, web-based tools 155, admin tools 160, etc.) interact. Secondary system 335 serves as a backup system to primary system 305. For instance, secondary system 335 can take over as the main system in the event that primary system 305 fails. In order to do so, the data in primary system 335 is replicated to secondary system 335. This way, if primary system 305 fails, secondary system 335 can take over as the main system in a seamless and efficient manner with minimal downtime.

As shown in FIG. 3A, primary system 305 includes system replication manager 310, data volumes 315, log volumes 320, and LSS store 325. Data volumes 315 and log volumes 320 may be data volumes 250 and log volumes 252, respectively, in index server 110 of primary system 305. Similarly, secondary system 335 includes system replication manager 340, data volumes 345, log volumes 350, and LSS store 355. Data volumes 345 and log volumes 350 can be data volumes 250 and log volumes 252, respectively, in index server 110 of secondary system 335. In some embodiments, the replication process of primary system 305 to secondary system 335 occurs in two phases: an initial data transmission phase and a continuous log transmission phase. In the initial data transmission phase, primary system 310 transmits data stored in data volumes 315 and LSS store 325 to secondary system 335. Secondary system 335 stores the data in its corresponding data volumes 345 and LSS store 355.

To determine which data to transmit to secondary system 335, system replication manager 310) first takes a snapshot of data volumes 315. Then, system replication manager 310 takes a snapshot of LSS store 325. Next, system replication manager 310 transmits all the data included in the snapshot of data volumes 315 to secondary system 335 (e.g., any data stored in data volumes 315 after system replication manager 310 takes the snapshot of data volumes 315 is not included in the data transmitted to secondary system 335). The data included in the snapshot of data volumes 315 that is trans-mitted to secondary system 335 is encrypted (e.g., using group-level encryption keys). System replication manager 310 then transmits all the data included in the snapshot of LSS store 325 (e.g., any data stored in LSS store 325 after system replication manager 310 takes the snapshot of LSS store 325 is not included in the data transmitted to secondary system 335) to secondary system 335. System replication manager 310 performs the snapshot operations in this order because the data pages stores a reference to the encryption key(s) used to encrypt and decrypt the data pages. By taking a snapshot of data volumes 315 before taking a snapshot of LSS store 325, all keys used to encrypt and decrypt the data in the snapshot of data volumes 315 are included in the snapshot of LSS store 325. If the snapshot of data volumes 315 is taken after the snapshot of LSS store 325, it is possible that a particular set of encryption keys are added after the snapshot of LSS store 325 is taken and subsequently used to encrypt data included in the snapshot of data volumes 315. In this case, secondary system 335 would not have the particular set of encryption keys and, thus, cannot decrypt the data encrypted with the particular set of encryption keys.

Upon receiving the encrypted data included in the snapshot of data volumes 315, system replication manager 340 stores it in data volumes 345. When system replication manager 340) receives the data included in the snapshot of LSS store 325, system replication manager 340) stores it in LSS store 355. At this point, the initial data transmission phase ends.

After the initial data transmission phase, primary system 305 and secondary system 335 enter into the continuous log transmission phase. As mentioned above, generating log data can include a log of all changes to database system 105 since the last system save point. The latest state of database system 105 may be restored by replaying the changes from such log data on top of the last system save point. While primary system 305 operates, primary system periodically generates log data and stores it in log volumes 320. Secondary system 335 may utilize this log data to replicate the state of primary system 305. Thus, during the continuous log transmission phase, each time primary system 305 generates log data, primary system 305 determines a set of encryption keys (e.g., a set of group-level encryption keys) to use to encrypt the log data. Next, primary system 305 encrypts the log data with the set of encryption keys and stores the encrypted log data in log volumes 320. Then, system replication manager 310 transmits the encrypted log data to secondary system 335.

Once system replication manager 340 receives the encrypted log data, system replication manager 340 stores it in log volumes 350. While in the continuous log transmission phase, secondary system 335 is configured to operate in replay mode where secondary system 335 replays the log data stored in log volumes 350. To replay a particular set of log data in log volumes 350, system replication manager 340 determines a set of encryption keys to use to decrypt the encrypted log data, decrypts the encrypted log data with the set of encryption keys, and replays the decrypted log data.

In some embodiments, a new set of encryption keys may be determined to be used for a tenant of the database system. For example, in some cases, a new set of encryption keys are determined to be used for a tenant of the database system when the tenant (or super-tenant) changes group-level encryption keys by performing a key rotation. In other cases, a new set of encryption keys are determined to be used for a tenant of the database system when an initial encryption keys is assigned to a new encryption group that is created for the tenant.

Figure 3B:
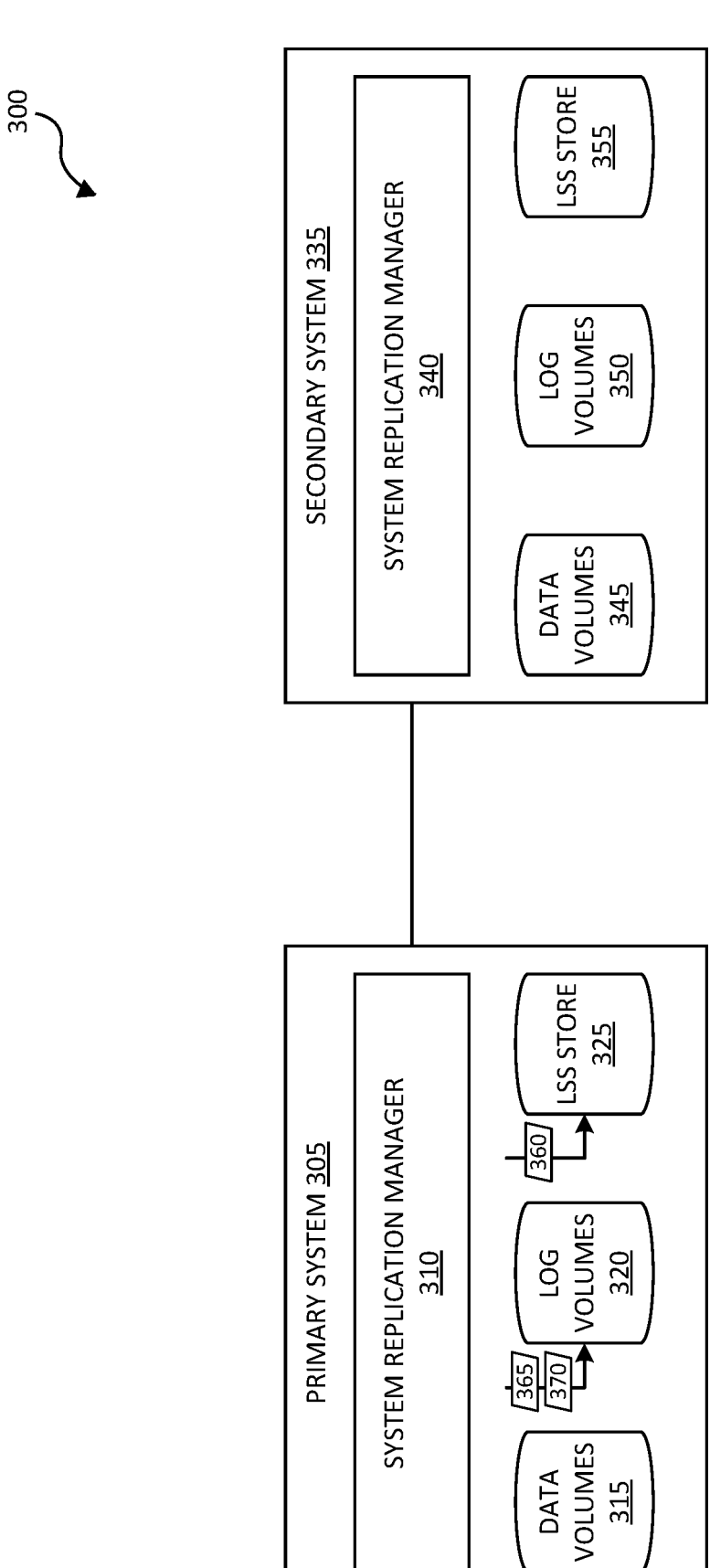

An example operation will now be described by reference to FIGS. 3B-3D. Specifically, the example operation will demonstrate how primary system 305 is replicated to secondary system 335 in response to a new set of encryption keys being determined to be used for a tenant of the database system. The operation begins by primary system 305 determining a new set of encryption keys 360 to be used for a tenant of the database system. In response to the determination, primary system 305 stores the new set of encryption keys 360 in LSS store 325, as depicted in FIG. 3B. Next, primary system 305 generates a first set of log data 365 that includes the data stored in LSS store 325 (which includes the set of encryption keys 360) and stores it in log volumes 320. Primary system 305 then generates a second set of log data 370 indicating that the new set of encryption keys are determined for the tenant for the database system and stores it in log volumes 320. FIG. 3B shows the first set of log data 365 and the second set of log data 370 being stored in log volumes 320.

Figure 3C:
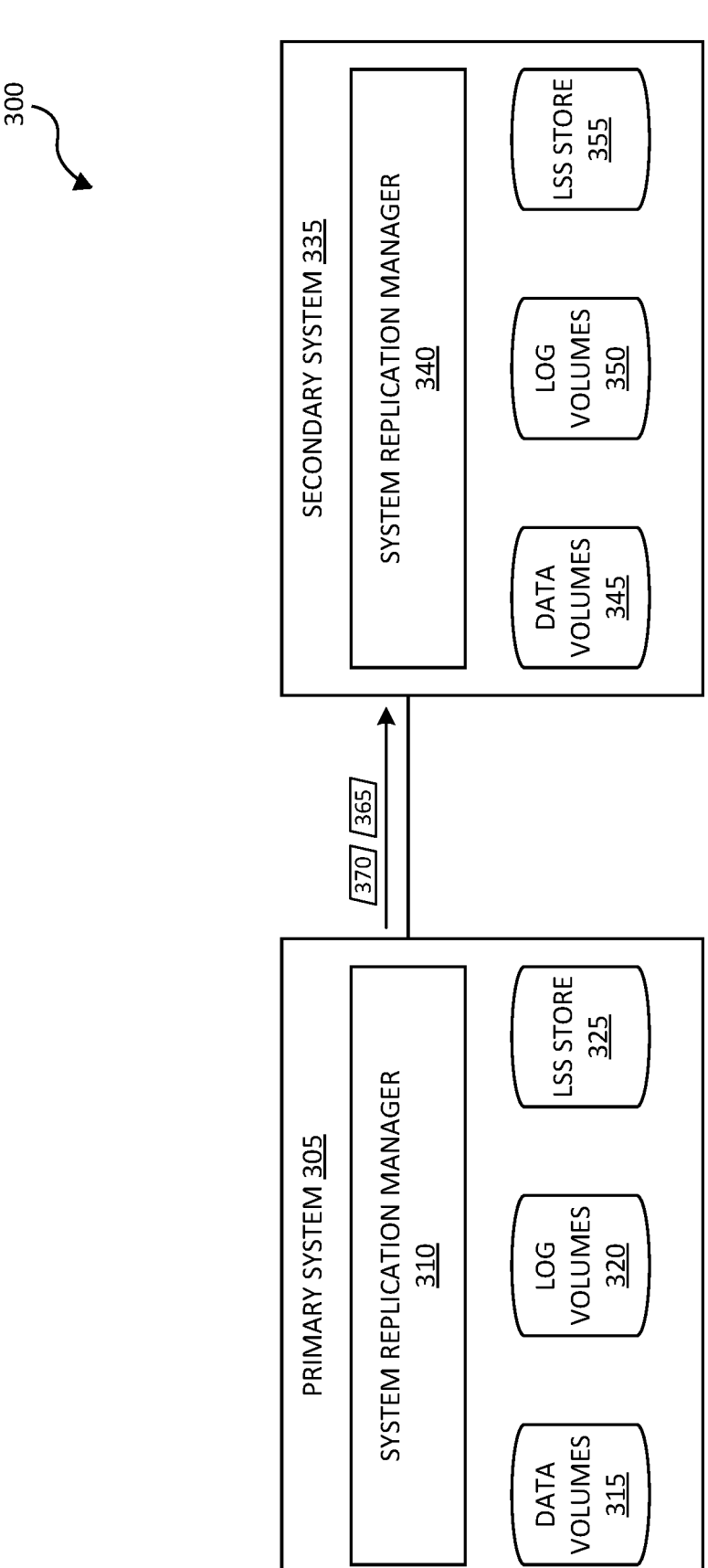

To facilitate the replication of the determined new set of encryption keys 360 from primary system 305 to secondary system 335, system replication manager 310 transmits the first set of log data 365 and the second set of log data 370 to secondary system 335, as illustrated in FIG. 3C. System replication manager 310 generates log data in this particular order because when the log data is replayed on secondary system 335, the new set of encryption keys are available when the log data for determining the new set of encryption keys for the tenant for the database system. That is, if primary system 305 generates the first set of log data 365 after generating the second set of log data 370, when secondary system 335 replays them in the order they were generated (i.e. replay the second set of log data 370 and the replay the first set of log data 365), the new set of encryption keys 360 will not be available when secondary system 335 replays the first set of log data 365.

Figure 3D:
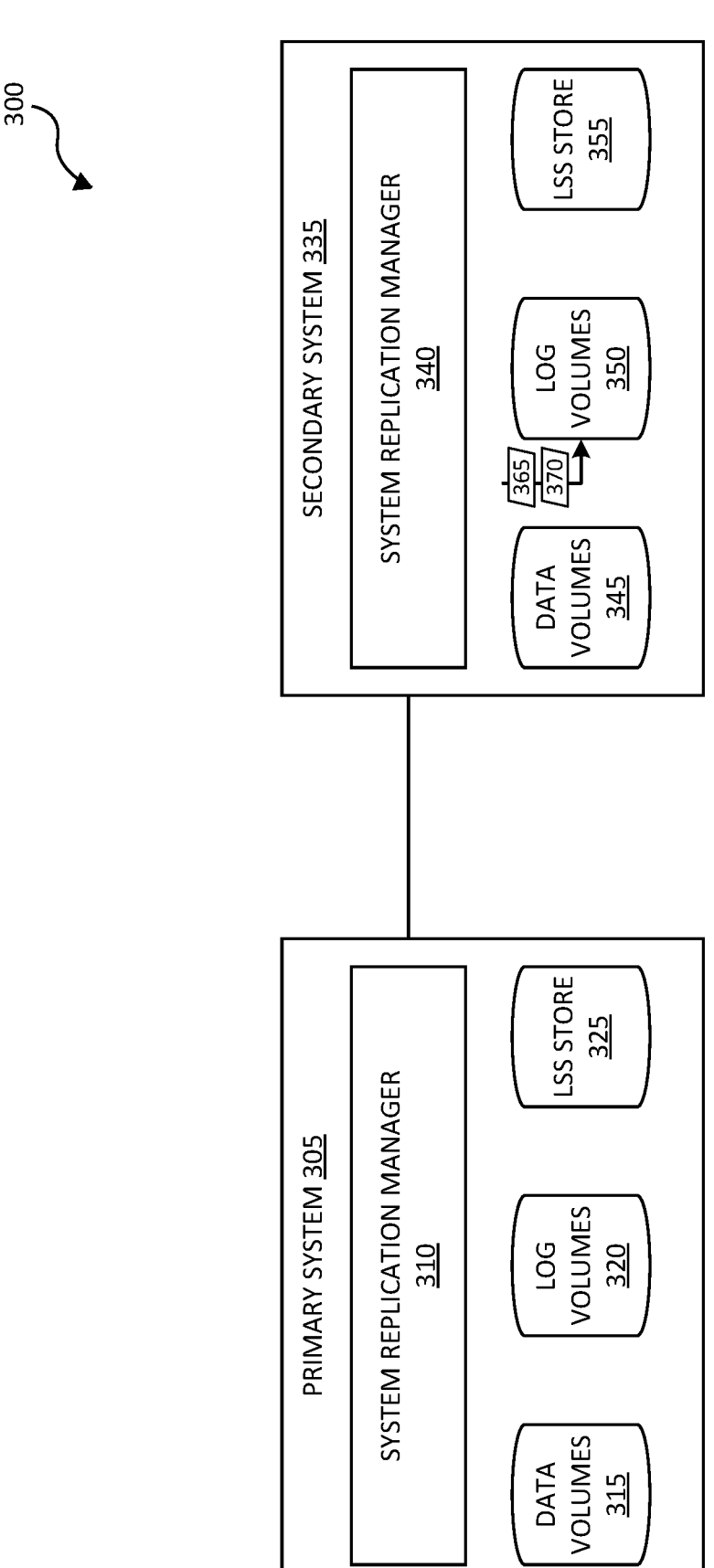

Turning now to FIG. 3D, when secondary system 335 receives the first set of log data 365 and the second set of log data 370 from primary system 305, system replication manager 340) stores them in log volumes 350. Since secondary system 335 is operating in replay mode during the continuous log transmission phase, secondary system 335 replays the log data stored in log volumes 350 in the order that they are generated by primary system 305. As mentioned above, to replay a particular set of log data in log volumes 350, system replication manager 340) determines a set of encryption keys to use to decrypt the encrypted log data, decrypts the encrypted log data with the set of encryption keys, and replays the decrypted log data. Here, when system replication manager 340 replays the first set of log data 365 stored in log volumes 350, it causes system replication manager 340) to update LSS store 355 with the data that includes the new set of encryption keys 360. Then, when system replication manager 340) replay's the second set of log data 370) stored in log volumes 350, it causes system replication manager 340) to determine the new set of encryption keys 360 stored in LSS store 355 to be a new set of encryption keys for the tenant of the database system. As such, this particular event (determining a new set of encryption keys for the tenant of the database system) that occurred in primary system 305 is replicated to secondary system 335.

FIG. 4 illustrates a process for managing encryption data for system replication of database systems according to some embodiments. In some embodiments, primary system 305 performs the process. The process begins by taking, at 410, a first snapshot of a first set of data stores configured to store data associated with a database system. Referring to FIG. 3A as an example, in the initial data transmission phase, system replication manager 310 may take a snapshot of data volumes 315.

After taking the first snapshot of the first set of data stores, the process takes, at 420, a second snapshot of a second set of data stores configured to store a set of encryption keys for a set of tenants of the database system. Referring to FIG. 3A as an example, system replication manager 310 can take a snapshot of LSS store 325.

Then, the process transmits, at 430, data included in the first snapshot of the first set of data stores to a secondary system. Referring to FIG. 3A as an example, system replication manager 310 may transmit all the data included in the snapshot of data volumes 315 to secondary system 335.

Finally, the process transmits, at 440, data included in the second snapshot of the second set of data stores to the secondary system. Referring to FIG. 3A as an example, system replication manager 310 can transmit all the data included in the snapshot of LSS store 325 to secondary system 335.

Figure 5:
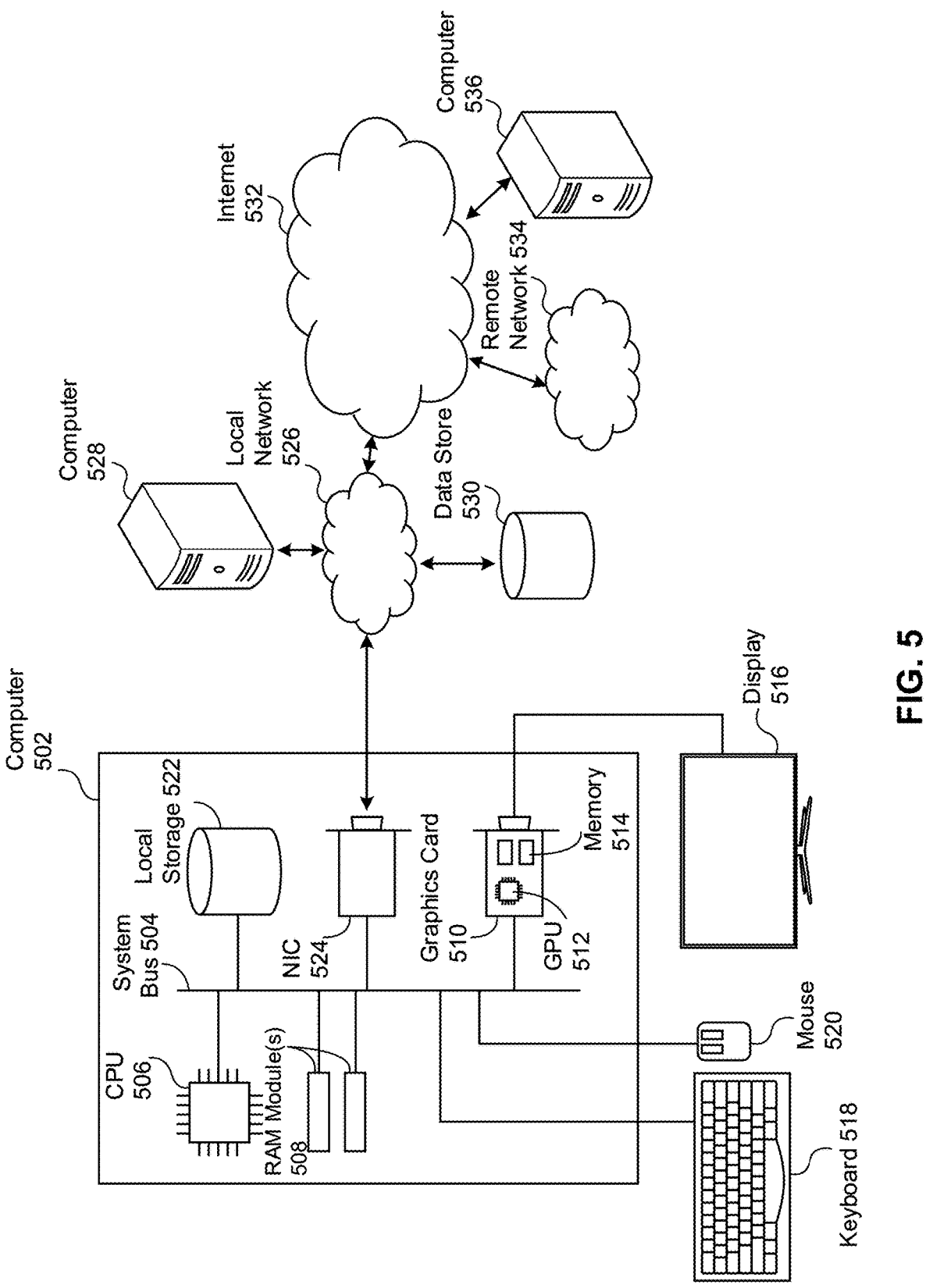
FIG. 5 illustrates an example computing device architecture for implementing various aspects described herein.

Turning now to FIG. 5, in which an exemplary hardware platform for certain embodiments is depicted. Computer 502 can be a desktop computer, a laptop computer, a server computer, a mobile device such as a smartphone or tablet, or any other form factor of general- or special-purpose computing device containing at least one processor. Depicted with computer 502 are several components, for illustrative purposes. In some embodiments, certain components may be arranged differently or absent. Additional components may also be present. Included in computer 502 is system bus 504, via which other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also, on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, such as non-transitory computer readable media, and may be internally installed in computer 502 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 126. NIC 524 can be any form of network interface known in the art, such as Ethernet, ATM, fiber, Bluetooth, or Wi-Fi (i.e., the Institute of Electrical and Electronics Engineers (IEEE) 802.11 family of standards). NIC 524 connects computer 502 to local network 526, which may also include one or more other computers, such as computer 528, and network storage, such as data store 530). Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over public Internet 532. Local network 526 is in turn connected to public Internet 532, which connects many networks such as local network 526, remote network 534 or directly attached computers such as computer 536. In some embodiments, computer 502 can itself be directly connected to public Internet 532.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship with each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a primary system, the program comprising sets of instructions for:

taking a first snapshot of a first set of data stores configured to store data associated with a database system;

after taking the first snapshot of the first set of data stores, taking a second snapshot of a second set of data stores configured to store a set of encryption keys for a set of tenants of the database system;

transmitting data included in the first snapshot of the first set of data stores to a secondary system;

transmitting data included in the second snapshot of the second set of data stores to the secondary system;

determining a new set of encryption keys for a tenant of the database system;

storing the new set of encryption keys in the second set of data stores;

generating a first set of log data that includes data stored in the second set of data stores;

generating a second set of log data indicating that the new set of encryption keys are determined for the tenant for the database system; and transmitting the first set of log data and the second set of log data to the secondary system.

2. The non-transitory machine-readable medium of claim 1, wherein the secondary system is configured to replicate a state of the primary system based on the data included in the first snapshot of the first set of data stores and the data included in the second snapshot of the second set of data stores.

3. The non-transitory machine-readable medium of claim 1, wherein the program further comprises a set of instructions for:

generating log data comprising changes to the database system since a last system save point;

determining a set of encryption keys to use to encrypt the log data;

encrypting the log data with the set of encryption keys;

storing the encrypted log data in a first log data store; and transmitting the encrypted log data to the secondary system, wherein the secondary system is configured to store the encrypted log data in a second log data store.

4. The non-transitory machine-readable medium of claim 3, wherein the secondary system is further configured to operate in a replay mode where the secondary system replays log data stored in the second log data store.

5. The non-transitory machine-readable medium of claim 4, wherein the set of encryption keys is a first set of encryption keys, wherein the secondary system replays the encrypted log data stored in the second log data store by determining a second set of encryption keys to use to decrypt the encrypted log data, decrypting the encrypted log data with the set of encryption keys, and replaying the decrypted log data.

6. The non-transitory machine-readable medium of claim 1, wherein the program further comprises a set of instructions for, after transmitting the data included in the first snapshot of the first set of data stores and the data included in the second snapshot of the second set of data stores to the secondary system, not transmitting any more data stored in the first set of data stores to the secondary system.

7. A method executable by a primary system, the method comprising:

taking a first snapshot of a first set of data stores configured to store data associated with a database system;

after taking the first snapshot of the first set of data stores, taking a second snapshot of a second set of data stores configured to store a set of encryption keys for a set of tenants of the database system;

transmitting data included in the first snapshot of the first set of data stores to a secondary system;

transmitting data included in the second snapshot of the second set of data stores to the secondary system;

determining a new set of encryption keys for a tenant of the database system;

storing the new set of encryption keys in the second set of data stores;

generating a first set of log data that includes data stored in the second set of data stores;

generating a second set of log data indicating that the new set of encryption keys are determined for the tenant for the database system; and transmitting the first set of log data and the second set of log data to the secondary system.

8. The method of claim 7, wherein the secondary system is configured to replicate a state of the primary system based on the data included in the first snapshot of the first set of data stores and the data included in the second snapshot of the second set of data stores.

9. The method of claim 7 further comprising:

generating log data comprising changes to the database system since a last system save point;

determining a set of encryption keys to use to encrypt the log data;

encrypting the log data with the set of encryption keys;

storing the encrypted log data in a first log data store; and transmitting the encrypted log data to the secondary system, wherein the secondary system is configured to store the encrypted log data in a second log data store.

10. The method of claim 9, wherein the secondary system is further configured to operate in a replay mode where the secondary system replays log data stored in the second log data store.

11. The method of claim 10, wherein the set of encryption keys is a first set of encryption keys, wherein the secondary system replays the encrypted log data stored in the second log data store by determining a second set of encryption keys to use to decrypt the encrypted log data, decrypting the encrypted log data with the set of encryption keys, and replaying the decrypted log data.

12. The method of claim 7 further comprising, after transmitting the data included in the first snapshot of the first set of data stores and the data included in the second snapshot of the second set of data stores to the secondary system, not transmitting any more data stored in the first set of data stores to the secondary system.

13. A primary system comprising:

a set of processing units; and a non-transitory machine-readable medium storing instructions that when executed by at least one processing unit in the set of processing units cause the at least one processing unit to:

take a first snapshot of a first set of data stores configured to store data associated with a database system;

after taking the first snapshot of the first set of data stores, take a second snapshot of a second set of data stores configured to store a set of encryption keys for a set of tenants of the database system;

transmit data included in the first snapshot of the first set of data stores to a secondary system;

transmit data included in the second snapshot of the second set of data stores to the secondary system;

determine a new set of encryption keys for a tenant of the database system;

store the new set of encryption keys in the second set of data stores;

generate a first set of log data that includes data stored in the second set of data stores;

generate a second set of log data indicating that the new set of encryption keys are determined for the tenant for the database system; and transmit the first set of log data and the second set of log data to the secondary system.

14. The primary system of claim 13, wherein a state of the primary system is replicated.

15. The primary system of claim 13, wherein the instructions further cause the at least one processing unit to:

generate log data comprising changes to the database system since a last system save point;

determine a set of encryption keys to use to encrypt the log data;

encrypt the log data with the set of encryption keys;

store the encrypted log data in a first log data store; and transmit the encrypted log data to the secondary system.

16. The primary system of claim 15, wherein log data stored in the second log data store is replayed.

17. The primary system of claim 16, wherein the set of encryption keys is a first set of encryption keys.

* * * * *